US009882672B2

(12) United States Patent
Vissers et al.

(10) Patent No.: US 9,882,672 B2
(45) Date of Patent: *Jan. 30, 2018

(54) METHOD AND APPARATUS FOR MAPPING AND DE-MAPPING IN AN OPTICAL TRANSPORT NETWORK

(71) Applicant: Huawei Technologies Co., Ltd., Shenzhen (CN)

(72) Inventors: Maarten Vissers, Amsterdam (NL); Qiuyou Wu, Shenzhen (CN); Xin Xiao, Shenzhen (CN); Wei Su, Amsterdam (NL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,439

(22) Filed: Mar. 17, 2016

(65) Prior Publication Data

US 2016/0204895 A1     Jul. 14, 2016

Related U.S. Application Data

(63) Continuation of application No. 14/566,478, filed on Dec. 10, 2014, now Pat. No. 9,312,982, which is a (Continued)

(30) Foreign Application Priority Data

Mar. 9, 2009    (CN) .......................... 2009 1 0106028

(51) Int. Cl.
    *H04J 3/00*       (2006.01)
    *H04J 14/08*     (2006.01)
    (Continued)

(52) U.S. Cl.
    CPC .............. *H04J 14/08* (2013.01); *H04B 10/27* (2013.01); *H04J 3/1652* (2013.01)

(58) Field of Classification Search
    USPC ........................................................ 370/476
    See application file for complete search history.

(56) References Cited

U.S. PATENT DOCUMENTS 7,894,482 B1 *   2/2011   Wu ....................... H04J 3/1652
    370/476
8,948,205 B2 *   2/2015   Vissers ................ H04J 3/1652
    370/476

(Continued)

FOREIGN PATENT DOCUMENTS

CN       1790993 A     6/2006
CN     101051879 A    10/2007

(Continued)

OTHER PUBLICATIONS

"G.709 amendment 3 (for consent)," International Telecommunication Union, Telecommunication Standardization Sector, Study Period 2009-2012, Study Group 15, TD 24R1 (PLEN/15), ITU, Geneva, Switzerland (Dec. 1-12, 2008).

(Continued)

*Primary Examiner* — Phuongchau Ba Nguyen
(74) *Attorney, Agent, or Firm* — Leydig, Voit & Mayer, Ltd.

(57) ABSTRACT

The embodiments of the present invention disclose methods and apparatuses for mapping processing and de-mapping processing in an optical transport network. a Low Order Optical Channel Data Unit (LO ODU) signal is mapped into a payload area of an Optical Channel Data Tributary (ODTU) signal in units of M bytes. M is equal to the number of time slots of a High Order Optical Channel Payload Unit (HO OPU) that are to be occupied by the ODTU signal, and M is an integer larger than 1. Overhead information is (Continued)

encapsulated to an overhead area of the ODTU signal. Thereafter, the ODTU signal is multiplexed into the HO OPU. In this way, an efficient and universal mode for mapping the LO ODU to the HO OPU is provided.

16 Claims, 9 Drawing Sheets

Related U.S. Application Data continuation of application No. 12/712,675, filed on Feb. 25, 2010, now Pat. No. 8,948,205.

(51) Int. Cl.
*H04J 3/16* (2006.01)
*H04B 10/27* (2013.01)

(56) References Cited

U.S. PATENT DOCUMENTS

| | | | |
|---|---|---|---|
| 9,312,982 B2* | 4/2016 | Vissers | H04J 3/1652 |
| 2002/0142757 A1 | 10/2002 | Leung et al. | |
| 2003/0048813 A1* | 3/2003 | Lahav | H04J 3/1611 370/537 |
| 2005/0068995 A1 | 3/2005 | Lahav et al. | |
| 2005/0163162 A1 | 7/2005 | Lanzone et al. | |
| 2005/0286521 A1* | 12/2005 | Chiang | H04J 3/1652 370/389 |
| 2006/0104309 A1 | 5/2006 | Vissers et al. | |
| 2007/0071443 A1* | 3/2007 | Fukumitsu | H04J 3/1611 398/79 |
| 2007/0076769 A1 | 4/2007 | Zou | |
| 2007/0104485 A1 | 5/2007 | Zhang | |
| 2007/0189336 A1* | 8/2007 | Zou | H04J 3/07 370/505 |
| 2007/0248121 A1* | 10/2007 | Zou | H04J 3/1611 370/498 |
| 2009/0074410 A1 | 3/2009 | Zou et al. | |
| 2009/0086767 A1* | 4/2009 | Li | H04J 3/1652 370/542 |
| 2010/0014857 A1 | 1/2010 | Haas | |
| 2010/0074624 A1* | 3/2010 | Miller | H04J 3/1652 398/98 |
| 2010/0221005 A1 | 9/2010 | Zhao | |
| 2010/0226652 A1 | 9/2010 | Vissers et al. | |
| 2011/0044686 A1 | 2/2011 | Wu et al. | |
| 2012/0002671 A1* | 1/2012 | Xiao | H04J 3/1652 370/389 |
| 2012/0281895 A1* | 11/2012 | Chono | A61B 8/461 382/128 |
| 2012/0281985 A1 | 11/2012 | Honma et al. | |

FOREIGN PATENT DOCUMENTS

| | | |
|---|---|---|
| CN | 101800614 A | 8/2010 |
| CN | 101800912 A | 8/2010 |
| CN | 101834688 B | 8/2011 |
| EP | 1826926 A1 | 8/2007 |
| EP | 2120380 A1 | 11/2009 |
| EP | 2148476 A1 | 1/2010 |
| JP | 2007096822 A | 4/2007 |
| JP | 2008092414 A | 4/2008 |
| JP | 2008258785 A | 10/2008 |
| JP | 2009243809 A | 10/2009 |
| RU | 2005135117 A | 5/2007 |
| RU | 2345494 C2 | 1/2009 |
| WO | 2008122218 A1 | 10/2008 |
| WO | 2008125060 A1 | 10/2008 |
| WO | 2010088856 A1 | 8/2010 |
| WO | 2010091604 A1 | 8/2010 |

OTHER PUBLICATIONS

"Series G: Transmission Systems and Media, Digital Systems and Networks; Digital Terminal Equipments-General; Series Y: Global Information Infrastructure, Internet Protocol Aspects and Next Generation Networks; Internet protocol aspects-Transport," ITU-T, Interfaces for the Optical Transport Network (OTN), G.709/Y.1331, ITU, Geneva, Switzerland (Mar. 2003).

"Series G: Transmission Systems and Media, Digital Systems and Networks; Digital Terminal Equipments-General; Series Y: Global Information Infrastructure, Internet Protocol Aspects and Next Generation Networks; Internet protocol aspects-Transport," ITU-T, Interfaces for the Optical Transport Network (OTN), G.709/Y.1331, ITU, Geneva, Switzerland (Dec. 2009).

Office Action in corresponding U.S. Appl. No. 12/712,675 (dated Aug. 22, 2012).

Office Action in corresponding U.S. Appl. No. 12/712,675 (dated Feb. 5, 2014).

Notice of Allowance in corresponding U.S. Appl. No. 12/712,675 (dated Jul. 8, 2014).

"Series G: Transmission Systems and Media, Digital Systems and Network; Digital terminal equipments- General; Series Y: Gobal Information Infrastructure, Internet Protocol Aspects and Next-Geneartion Netowrks; Internet protocol aspects—Transport; Interfaces for the Optical Transport Network (OTN); Corrigendum 2," G.709/Y.1331, Corrigendum 2, pp. i-2, International Telecommunication Union, Geneva, Switzerland (Jan. 2009).

Official Decision of Grant in corresponding Russian Application No. 2010108250 now U.S. Pat. No. 2,439,708 (dated Aug. 4, 2011).

1$^{st}$ Office Action in corresponding European Application No. 10153800.7 (dated Feb. 20, 2012).

1$^{st}$ Office Action in corresponding Russian Application No. 2010108250/08 (dated Mar. 5, 2010).

Rejection Decision in corresponding Japanese Application No. 2010-048838 (dated Nov. 8, 2011).

Extended European Search Report in corresponding European Patent Application No. 10153800.7 (dated Mar. 31, 2010).

* cited by examiner

METHOD AND APPARATUS FOR MAPPING AND DE-MAPPING IN AN OPTICAL TRANSPORT NETWORK

CROSS-REFERENCE TO RELATED APPLICATIONS

This application is a continuation application of U.S. patent application Ser. No. 14/566,478, filed on Dec. 10, 2014, which is a continuation application of U.S. patent application Ser. No. 12/712,675, filed on Feb. 25, 2010, now U.S. Pat. No. 8,948,205, which claims the benefit of Chinese Patent Application No. 200910106028.2, filed on Mar. 9, 2009. The afore-mentioned patent applications are hereby incorporated by reference in their entireties.

FIELD

The present invention relates to the field of communication technologies, and particularly, to a mapping technique in an optical transport network.

BACKGROUND

With the quick development of communication technology, the Optical Transport Network (OTN) with advantages of flexible scheduling and management of large capacity services is increasingly becoming a major technology of the backbone transport network. In the OTN, the client data is encapsulated into an Optical Channel Payload Unit (OPU), some overhead (OH) is added to the OPU to constitute an Optical Channel Data Unit (ODU), some OH and Forward Error Correction (FEC) is added into the ODU to constitute an Optical Channel Transport Unit (OTU), and is finally transmitted in the form of OTU.

With the rapid development of data service, more and more clients adopt Ethernet technology as the physical interface at the client side. It is foreseeable that in the coming years, the Ethernet service will keep a continuous high-speed growth. However, the current OTN technology is designed based on speech service such as synchronous digital hierarchy (SDH), and cannot well support the development trend of data service like Ethernet, thus studies are gradually carried out on the next generation of OTN network (NG OTN). The NG OTN is required to not only meet the requirements of services newly appear, but also bear the current OTN. Thus how to map a Lower Order Optical Channel Data Unit (LO ODU) to a Higher Order Optical Channel Data Unit (HO ODU) is a focus being discussed in the industry. The LO ODU may be ODUk (k=0, 1, 2, 2e, 3, 3e) existing in the current OTN, and herein represented as LO ODUk (k=0, 1, 2, 2e, 3, 3e); the HO ODU may be regarded as a data transmission unit of higher rate, which belongs to the category of the NG OTN and is used for bearing the LO ODU, the corresponding OPU is represented as HO OPUk (k=1, 2, 3, 3e, 4).

The conventional technical solution maps the standard ODUj (j=1, 2) (for 20 ppm bit tolerance) into the OPUk (k=2, 3) in an asynchronous manner. The asynchronous method maps the ODUj signal into the OPUk through an adjustment policy of −1/0/+1/+2. With the asynchronous manner, a maximum bit error tolerance between ODU1 and OPU2 is −113 to +83 ppm, a maximum bit error tolerance between ODU1 and OPU3 is −96 to +101 ppm, and a maximum bit error tolerance between ODU2 and OPU3 is −95 to +101 ppm.

However, the conventional method is not suitable for mapping the LO ODU into the HO ODU, e.g. for ODU2e (100 ppm bit tolerance), etc. ODUflex of higher bit tolerance may occur, and the adjustment policy of −1/0/+1/+2 does not meet the requirement for mapping the LO ODU into the HO ODU.

SUMMARY

The embodiments of the present invention provide method and apparatus for mapping and de-mapping in an Optical Transport Network (OTN), so as to map a Low Order Optical Channel Data Unit (LO ODU) signal into a High Order Optical Channel Payload Unit (HO ODU) universally and efficiently.

The embodiments of the present invention provide a mapping method in an OTN.

First, a Low Order Optical Channel Data Unit (LO ODU) signal is mapped into a payload area of an Optical Channel Data Tributary Unit (ODTU) signal in units of M bytes, wherein M is equal to the number of time slots of a High Order Optical Channel Payload Unit (HO OPU) that are to be occupied by the ODTU signal, and M is an integer larger than 1.

And, overhead information is encapsulated to an overhead area of the ODTU signal.

Finally, the ODTU signal is multiplexed into the HO OPU.

The embodiment of the present invention also provides an apparatus for processing data in an OTN.

The apparatus comprises a processor and a computer readable medium having a plurality of computer executable instructions stored thereon. The instructions when executed by the processor, would cause the processor to perform the steps of above mapping method.

The embodiments of the present invention also provide a de-mapping method in an OTN.

In the de-mapping method, first parse a HO OPU to obtain an ODTU signal.

Then, de-map in units of M bytes to obtain a Low Order Optical Channel Data Unit (LO ODU) signal from a payload area of the ODTU signal, wherein M is equal to the number of time slots of the HO OPU that are occupied by the ODTU, and M is an integer larger than 1.

The embodiments of the present invention further provide a de-mapping apparatus in an OTN.

The de-mapping apparatus comprises a processor and a computer readable medium having a plurality of computer executable instructions stored thereon. The instructions when executed by the processor, would cause the processor to perform the steps of above de-mapping method.

The embodiments of the present invention further provide a mapping apparatus in an OTN. The mapping apparatus comprises a mapping unit, a encapsulating unit and a multiplexing unit. The mapping unit is configured to map a Low Order Optical Channel Data Unit (LO ODU) signal into a payload area of an Optical Channel Data Tributary Unit (ODTU) signal in units of M bytes, wherein M is equal to the number of time slots of a High Order Optical Channel Payload Unit (HO OPU) that are to be occupied by the ODTU signal, and M is an integer larger than 1. The encapsulating unit is configured to encapsulate overhead information to an overhead area of the ODTU signal. The multiplexing unit is configured to multiplexing the ODTU signal into the HO OPU.

The embodiments of the present invention further provide a de-mapping apparatus in an OTN. The de-mapping apparatus comprises a paring unit, a de-mapping unit. The parsing unit is configured to parse a High Order Optical Channel Payload Unit (HO OPU) to obtain an Optical Channel Data Tributary Unit (ODTU) signal. The de-mapping unit is configured to de-map in units of M bytes to obtain a Low Order Optical Channel Data Unit (LO ODU) signal from a payload area of the ODTU signal, wherein M is equal to the number of time slots of the HO OPU that are occupied by the ODTU, and M is an integer larger than 1.

In the above embodiments, optionally, the encapsulated overhead information may comprises information indicating the number of M-byte data units of the LO ODU signal that are mapped during a multi-frame period According to at least some of the embodiments of the present invention a high-efficient and universal mode for mapping LO ODU to HO OPU is achieved.

BRIEF DESCRIPTION OF THE DRAWINGS

In order to describe the technical solutions of the embodiments of the present invention more clearly, the drawings needed for describing the embodiments are introduced briefly as follows. It is apparent that the following drawings are just some embodiments of the present invention, and a person skilled in the art can obtain other drawings based on these drawings without paying a creative effort.

DETAILED DESCRIPTION OF THE EMBODIMENTS

The technical solutions of the embodiments of the present invention are clearly described as follows in conjunction with the drawings of the embodiments. It is apparent that the described embodiments are just a part of embodiments of the present invention, instead of all embodiments thereof. Based on the embodiments of the present invention, other embodiments, which are obtained by a person skilled in the art without paying a creative effort, all fall within the protection scope of the present invention.

Figure 1:
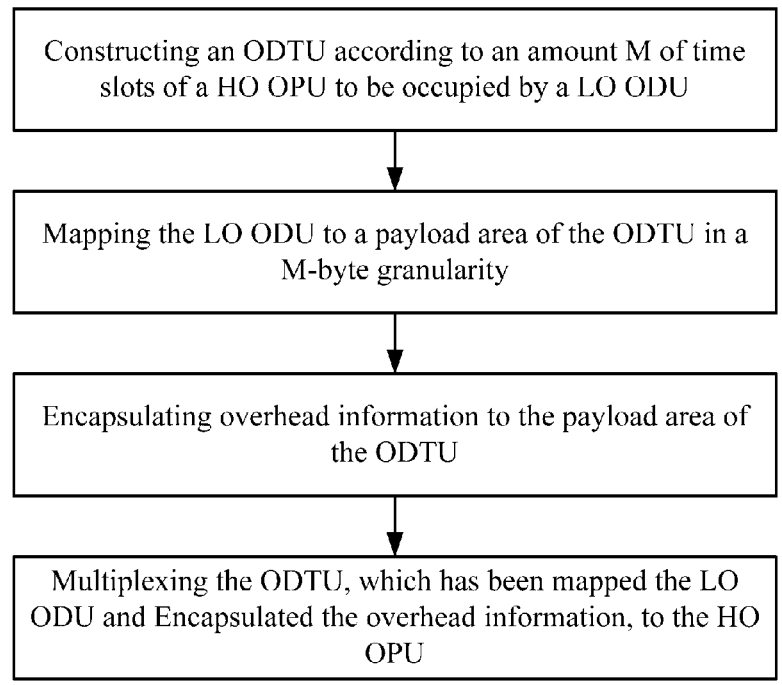
FIG. 1 is a flowchart of a mapping method in an OTN according to an embodiment of the present invention.

At the data transmitting side, as shown in FIG. 1, a mapping method in an OTN according to an embodiment of the present invention includes:

constructing an ODTU according to an amount M of time slots of an HO OPU to be occupied by an LO ODU;

mapping the LO ODU to a payload area of the ODTU in an M-byte granularity; encapsulating overhead information to the overhead area of the ODTU; and multiplexing the ODTU, which has been mapped the LO ODU and encapsulated with the overhead information, to the HO OPU, so as to provide an efficient and universal mode for mapping the LO ODU to the HO OPU.

For the convenience of understanding the embodiments of the present invention, the implementation processes of those embodiments during specific applications are described in detail as follows.

Figure 2:
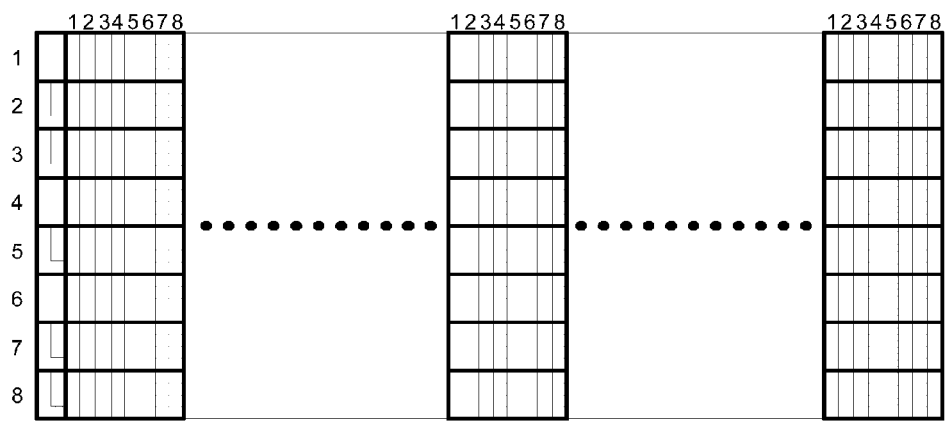
FIG. 2 is a structural schematic view illustrating dividing an HO OPU into eight 1.25G time slots according to an embodiment of the present invention.

The mapping method in an OTN according to an embodiment of the present invention includes:

S1: constructing an ODTU according to an amount M of time slots of an HO OPU to be occupied by an LO ODU;

The step includes:

S11: determining the amount M of the time slots of the HO OPU to be occupied by the LO ODU;

Specifically, the amount M of the time slots of the HO OPU to be occupied by the LO ODU may be determined according to the rate of the LO ODU and the rate of a single time slot of the HO OPU, i.e. M=upper rounding of (the rate of the LO ODU/the rate of a single time slot of the HO OPU). For example, HO OPU2 is divided into eight 1.25G time slots, and eight frames of HO OPU2 forms a large multi-frame, as shown in FIG. 2. If the rate of a certain LO ODU is assumed as 6G, then five time slots shall be occupied, and M is 5. We can allocate five time slots to the current LO ODU according to the usage conditions of the time slots in the HO OPU, herein the five time slots allocated to the current LO ODU are assumed as time slots 2, 3, 5, 7 and 8.

Of course, other methods may also be adopted to determine M and allocate the time slots to be occupied. Meanwhile, they are not limited by the embodiments of the present invention, and fall within the protection scope of the embodiments of the present invention.

S12: constructing the ODTU;

The ODTU includes M time slots, and further includes Justification Control Overhead (JC OH) corresponding to JC OH position of the HO OPU. As shown in FIG. 2, the ODTU includes the time slots 2, 3, 5, 7 and 8 in the multi-frame formed of eight HO OPUs, and further includes JC OH position of HO OPU frames to which the respective time slots correspond. The shaded portions in FIG. 2 form corresponding ODTU.

S2: mapping the LO ODU to a payload area of the ODTU in an M-byte granularity;

The step includes:

S21: determining an amount of LO ODU(s) of M-bytes to be mapped when mapping in the M-byte granularity, according to an amount X of the LO ODU(s) to be transmitted during each multi-frame period, and herein is represented as C8M; in another embodiment of the present invention, determining clock information according to the amount X of the LO ODU(s) to be transmitted during each multi-frame period, and herein is represented as C8-delta. The above two information is represented as "C8M+C8-delta".

In which, the method for acquiring X is existing, and hence is not described in the embodiments of the present invention.

Specifically, the embodiment of the present invention may use the following method to determine "C8M+C8-delta":

C8M, MAX=(LO ODU rate*LO ODU maximum frequency deviation)/(M*TS rate*TS minimum frequency deviation)*15232

C8M, MIN=(LO ODU rate*LO ODU minimum frequency deviation)/(M*TS rate*TS maximum frequency deviation)*15232

Where C8M is an integer value with a range of [C8M, MIN lower rounding, C8M, MAX upper rounding]. C8-delta is X−M*C8M, indicating the clock information, where X is C8, and C8 is an integer value with a range of [C8, MIN lower rounding, C8, MAX upper rounding].

C8, MAX=(LO ODU rate*LO ODU maximum frequency deviation)/(TS rate*TS minimum frequency deviation)*15232

C8, MIN=(LO ODU rate*LO ODU minimum frequency deviation)/(TS rate*TS maximum frequency deviation)*15232

Assuming a certain LO ODU has its X=76111 and occupies M=5 time slots, then C8M=(X/M) lower rounding=15222, C8-delta=X−M*C8M=1. Or C8M=(X/M) lower rounding +1=15223, C8-delta=X−M*C8M=−4. The mapped data information and clock information can be completely reflected by transmitting the information "C8M+C8-delta", i.e. (15222, 1) or (15223, −4). The receiving side may perceive, according to (15222, 1) or (15223, −4), that the transmitting side needs to transmit client data of 76111 bytes during one multi-frame period, so as to accurately recover the client clock at the receiving side.

The present invention may also use other methods to determine "C8M+C8-delta". Meanwhile, they are not limited by the embodiments of the present invention, and all fall within the protection scope of those embodiments.

S22: mapping the amount of the LO ODU(s) of M-byte to the payload area of the ODTU in the M-byte granularity.

Mapping in the M-byte granularity means performing one time of mapping operation of M bytes of client data as a whole; as the above example, mapping the amount of the LO ODU(s) of M-byte to the payload area of the ODTU in the M-byte granularity means mapping 15222 or 15223 LO ODUs of 5-byte to the payload area of the ODTU, performing the mapping operation every 5 bytes of LO ODU, and totally mapping for 15,222 or 15,223 times.

Specifically, the sigma-delta algorithm or other Generic Mapping Procedure (GMP) mapping methods may be used to map the LO ODU(s) to the payload area of the ODTU, the other GMP mapping methods meet the following characteristics:

1. being capable of automatically determining a filling amount according to the mapped signals and the rate of a target container;
2. being capable of automatically determining distribution positions of the filling and mapping signals in the target container according to the mapped signals and the rate of the target container; and
3. transporting position information carrying the filling and mapping signals in the overhead of the target container.

The characteristic information of the GMP mapping method in the embodiments of the present invention is further described with the following two mapping modes, but is not limited by the two mapping modes.

Figure 3:
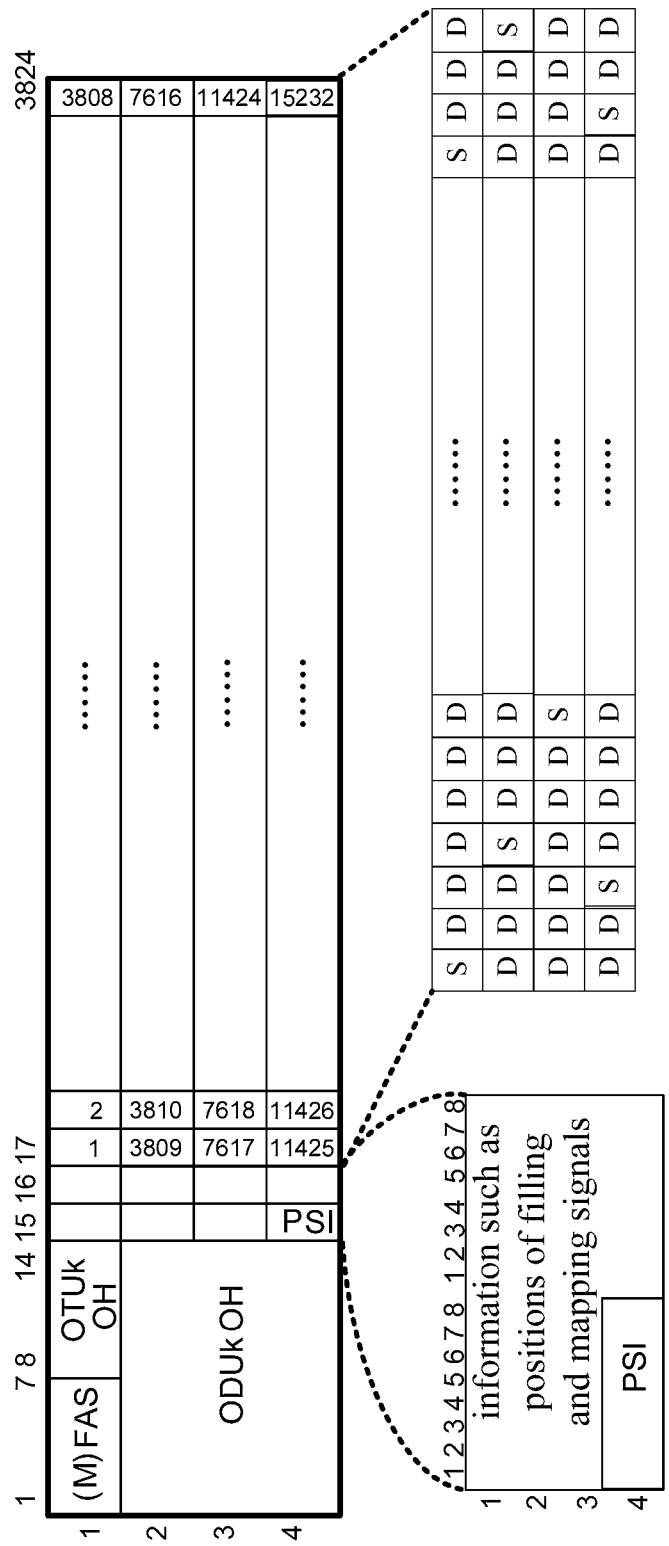
FIG. 3 is a schematic view illustrating a mapping mode according to an embodiment of the present invention.

Mapping mode 1: evenly distributing filling data and mapping signal data to the payload area through the sigma-delta algorithm. Information such as positions of the filling and mapping signals is carried and transported by the overhead of the target container; the effect after the mapping is shown in FIG. 3, where S is filling data and D is mapping signal data; the filling data and the mapping signal data are evenly distributed to the payload area.

Figure 4:
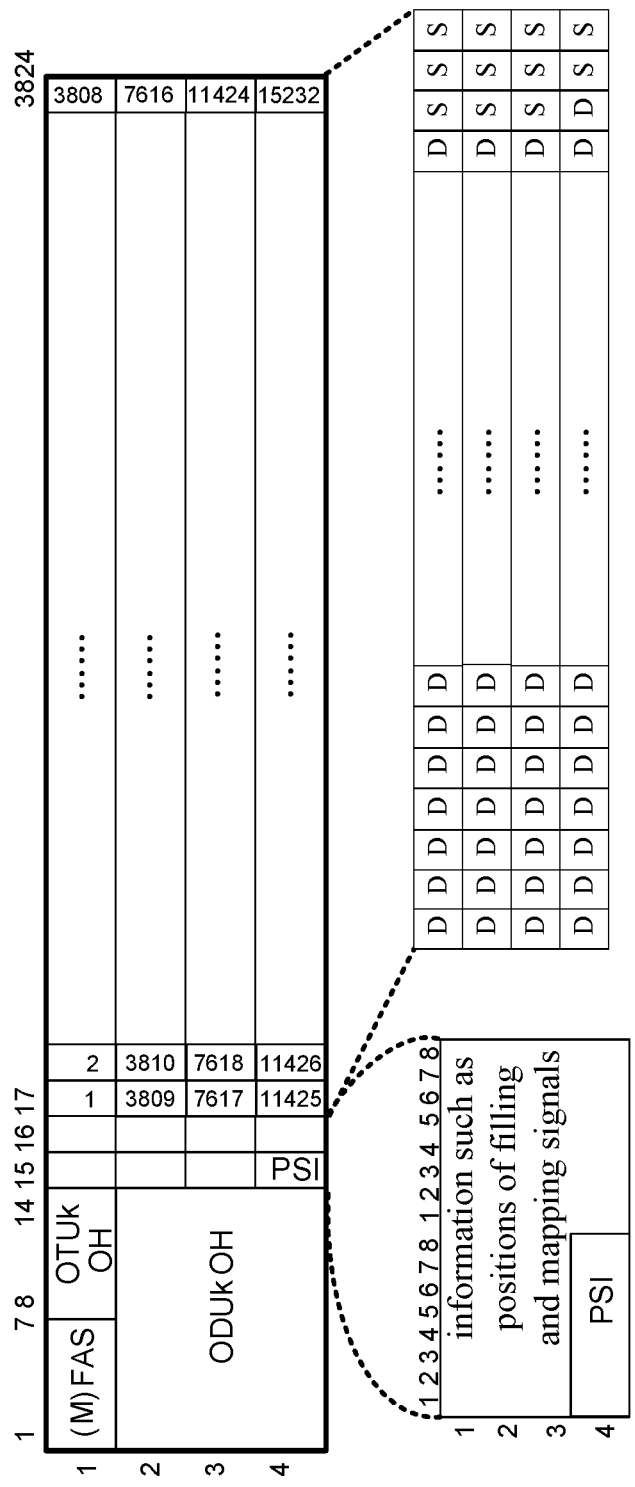
FIG. 4 is a schematic view illustrating another mapping mode according to an embodiment of the present invention.

Mapping mode 2: concentratedly placing the filling data in a fixed position of the payload area, and determining which portions in the payload area are for the filling data and which portions in the payload area are for the mapping signal data according to the filling amount. Information such as positions of the filling and mapping signals is carried and transported by the overhead of the target container; the effect after the mapping is shown in FIG. 4, where S is the filling data and D is the mapping signal data.

S3: encapsulating overhead information to the overhead area of the ODTU;

In an embodiment of the present invention, the overhead information includes the amount information of the LO ODU(s) of M-byte, and encapsulating the overhead information to the overhead area of the ODTU includes:

encapsulating the amount information of the LO ODU(s) of M-byte to the overhead area of the ODTU;

Specifically, encapsulating the amount information of the LO ODU(s) of M-byte to the overhead area of the ODTU includes:

directly encapsulating the amount information of the LO ODU(s) of M-byte to the overhead area of the ODTU, and a form of "C8M" may be used; or dividing the amount information of the LO ODU(s) of M-byte into a fixed portion of the amount information of the LO ODU(s) of M-byte and a variable portion of the amount information of the LO ODU(s) of M-byte, and encapsulating the fixed portion of the amount information of the LO ODU(s) of M-byte and the variable portion of the amount information of the LO ODU(s) of M-byte to the overhead area of the ODTU; transporting in a form of this overhead information may also achieve the same effect. Specifically, a form of "C8M-base+C8M-delta" may be adopted, where C8M-base+C8M-delta equivalent to C8M, indicating an amount of M-bytes in the LO ODU(s) mapped to the payload area of the ODTU; C8M-base is an amount of M-bytes in the fixed portion, and C8M-delta is an amount of M-bytes in the variable portion; or determining amount information of the LO ODU(s) of M-byte to be filled according to the amount information of the LO ODU(s) of M-byte, and encapsulating the amount information of the LO ODU(s) of M-byte to be filled to the overhead area of the ODTU; Transmitting in a form of this overhead information may also achieve the same effect; specifically, a form of "S8M" may be adopted, where S represents the filling data, S8M indicates an amount of filled bytes in the ODTU after the LO ODU(s) are mapped to the ODTU, and S8M=15232−C8M.

In another embodiment of the invention, the overhead information includes the amount information of the LO ODU(s) of M-byte and the clock information, encapsulating the overhead information to the overhead area of the ODTU includes:

encapsulating the amount information of the LO ODU(s) of M-byte and the clock information to the overhead area of the ODTU.

Specifically, encapsulating the amount information of the LO ODU(s) of M-byte and the clock information to the overhead area of the ODTU includes:

directly encapsulating the amount information of the LO ODU(s) of M-byte and the clock information to the overhead area of the ODTU, and a form of "C8M+C8-delta" may be used; or dividing the amount information of the LO ODU(s) of M-byte into a fixed portion of the amount information of the LO ODU(s) of M-byte and a variable portion of the amount information of the LO ODU(s) of M-byte, and encapsulating the fixed portion of the amount information of the LO ODU(s) of M-byte and the variable portion of the amount information of the LO ODU(s) of M-byte to the overhead area of the ODTU; transporting in a form of this overhead information may also achieve the same effect; specifically, a form of "C8M-base+C8M-delta+C8-delta" may be used, where C8M-base+C8M-delta equivalents to C8M, indicating an amount of M-bytes in the LO ODU(s) mapped to the payload area of the ODTU; C8M-base is an amount of M-bytes in the fixed portion, and C8M-delta is an amount of M-bytes in the variable portion; or determining amount information of the LO ODU(s) of M-byte to be filled according to the amount information of the LO ODU(s) of M-byte, and encapsulating the amount information of the LO ODU(s) of M-byte to be filled to the overhead area of the ODTU; transporting in a form of this overhead information may also achieve the same effect; specifically, a form of "S8M+S8-delta" may be adopted, where S represents the filling data, S8M indicates an amount of filled bytes in the ODTU after the LO ODU(s) are mapped to the ODTU, S8M=15232−C8M, and S8-delta indicates the clock information.

Encapsulating the overhead information to the overhead area of the ODTU includes:

encapsulating the overhead information to an overhead corresponding to a first time slot or a last time slot in the ODTU.

The overhead information indicates clock information and an amount of the LO ODU(s) of M-byte mapped to the ODTU in next n multi-frames, or indicates clock information and an amount of the LO ODU(s) of M-byte mapped to the ODTU in next n frames, where n is a natural number.

In an embodiment of the present invention, the "C8M+C8-delta" information indicates conditions of the clock information and an amount of M-bytes in the LO ODU(s) mapped to the ODTU in the next multi-frame.

Figure 5:
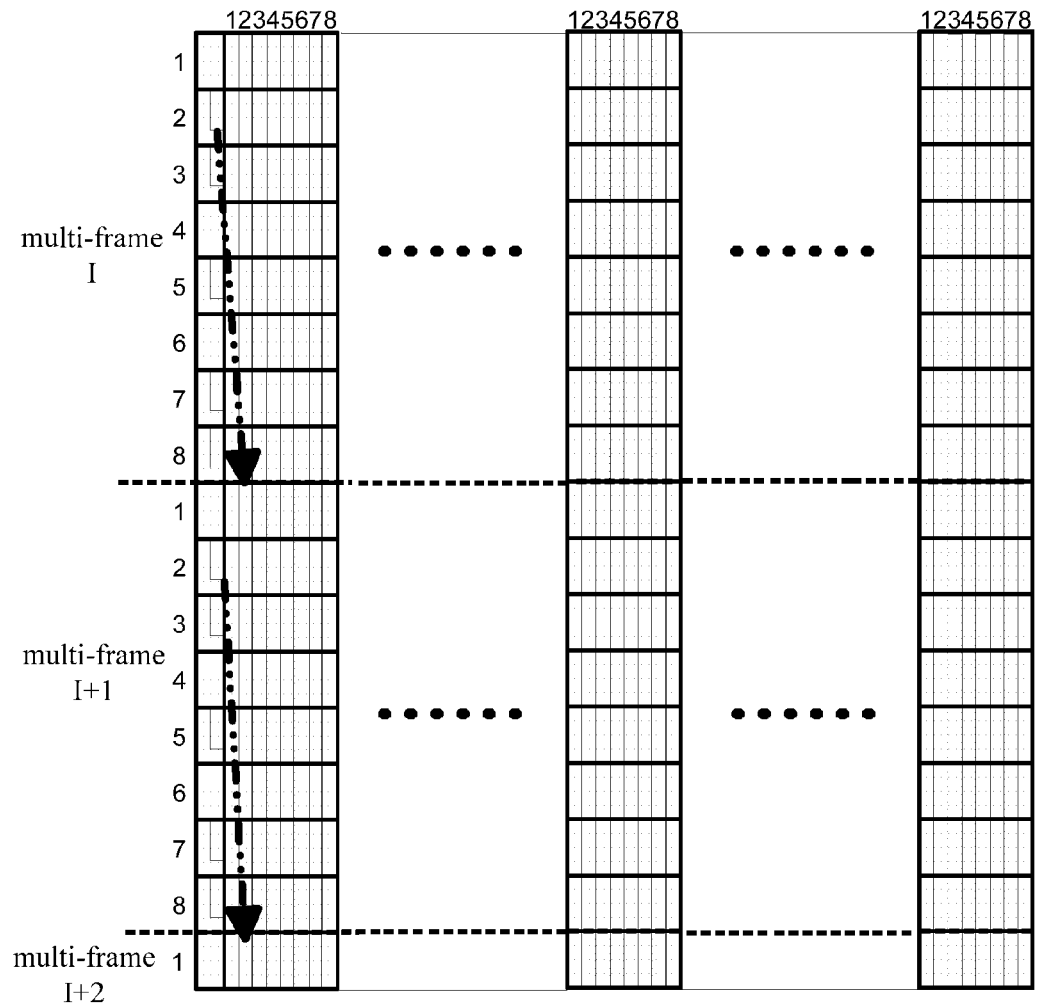
FIG. 5 is a schematic view illustrating a mapping from LO ODU to HO OPU2 according to an embodiment of the present invention.
Figure 6:
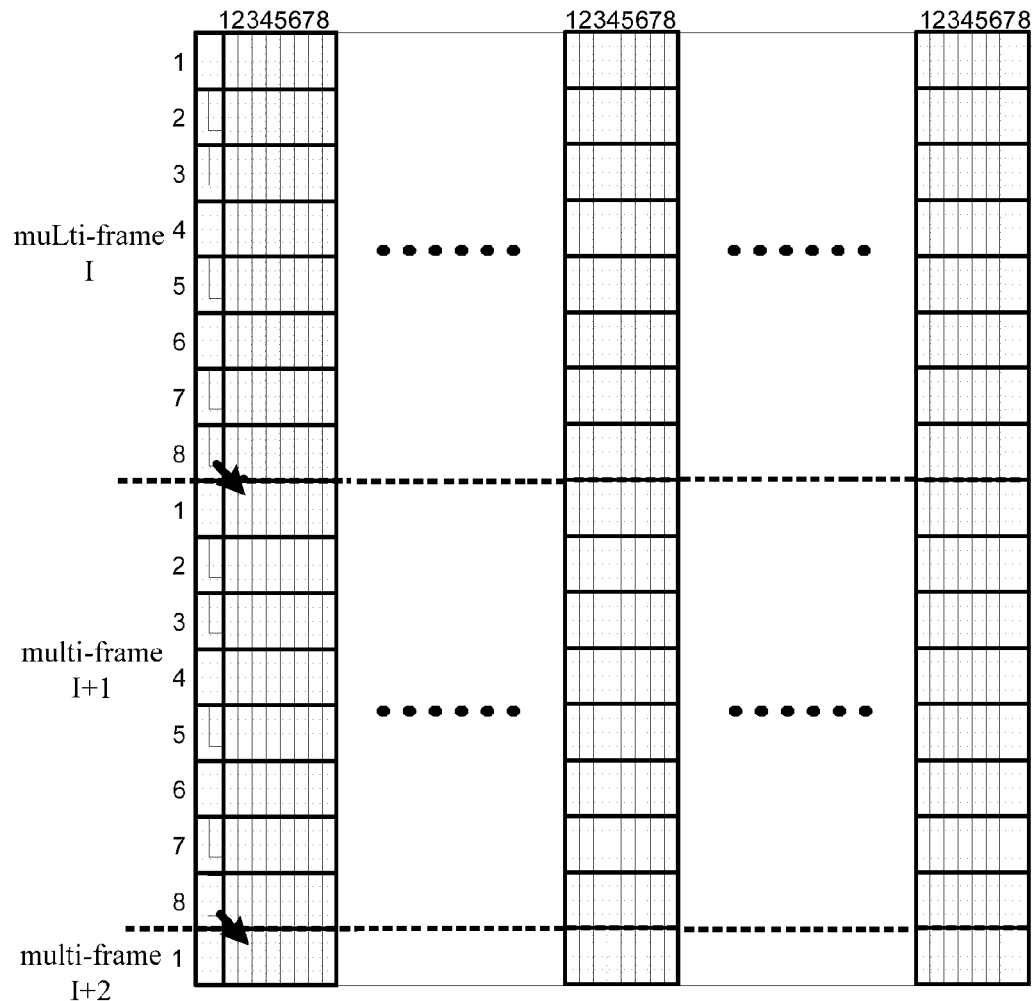
FIG. 6 is a schematic view illustrating another mapping from LO ODU to HO OPU2 according to an embodiment of the present invention.

If the "C8M+C8-delta" information is encapsulated to the JC OH corresponding to the first time slot in the ODTU, i.e. the JC OH position of the $2^{nd}$ frame of HO OPU corresponding to the time slot 2 in the current multi-frame, then the mapping process is shown in FIG. 5. If the "C8M+C8-delta" information is encapsulated to the JC OH corresponding to the last time slot in the ODTU, i.e. the JC OH position of the $8^{th}$ frame of HO OPU corresponding to the time slot 8 in the current multi-frame, then the mapping process is shown in FIG. 6.

In another one embodiment of the invention, the "C8M-base+C8M-delta+C8-delta" information indicates conditions of the clock information and an amount of M-bytes in the LO ODU(s) mapped to the ODTU in the next frame of HO OPU.

Figure 7:
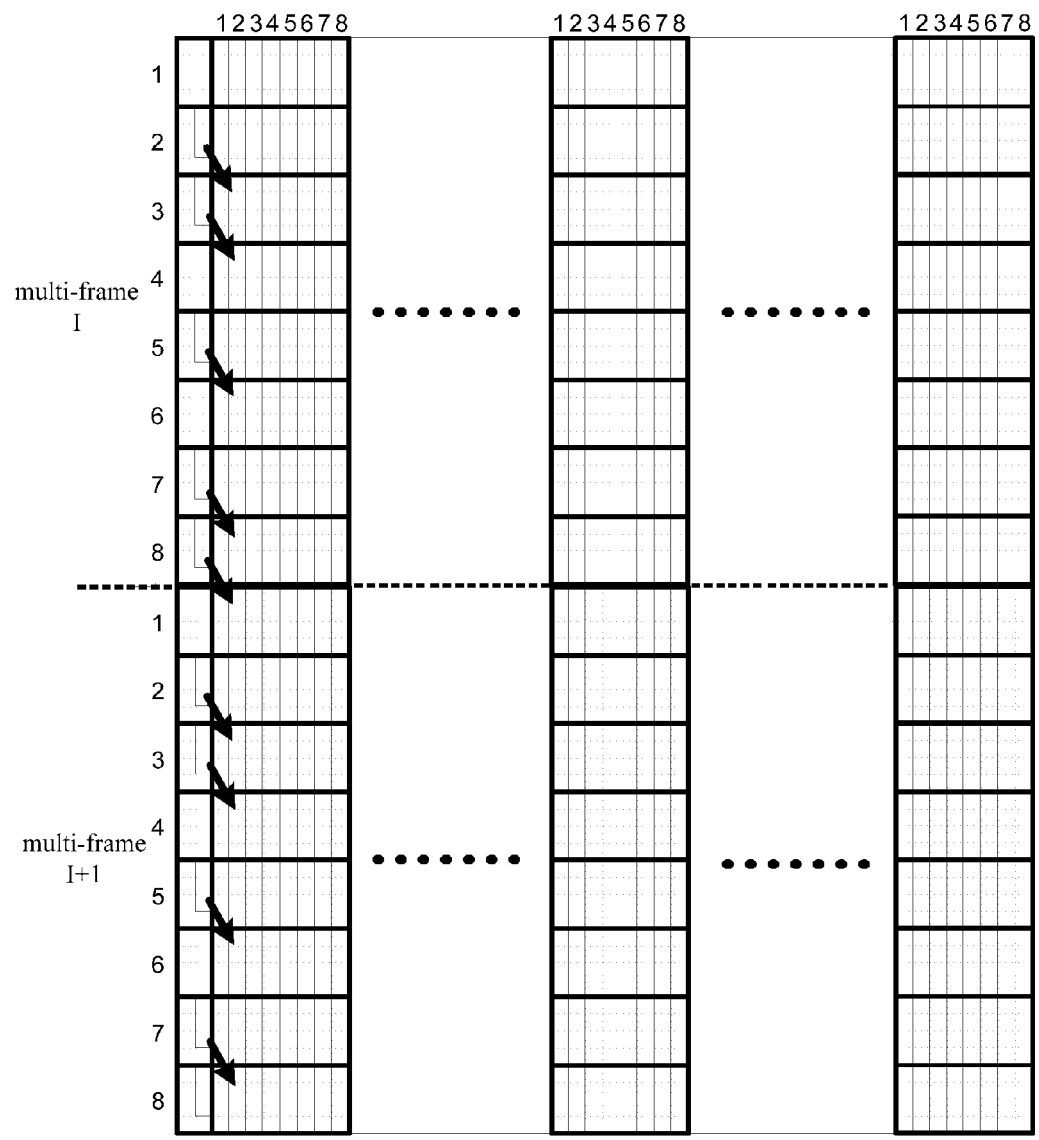
FIG. 7 is a schematic view illustrating another mapping from LO ODU to HO OPU2 according to an embodiment of the present invention.

Also taking HO OPU2 as an example, in the embodiment, as shown in FIG. 7, encapsulating "C8M-base+C8M-delta+C8-delta" to the JC OH positions of the $2^{nd}$, $3^{rd}$, $5^{th}$, $7^{th}$ and $8^{th}$ frames of HO OPU2 corresponding to time slots 2, 3, 5, 7 and 8 in the current multi-frame, respectively. The information "C8M-base+C8M-delta+C8-delta" at the $2^{nd}$, $3^{rd}$, $5^{th}$, $7^{th}$ and $8^{th}$ frames of HO OPU2 indicate clock information and amounts of M-bytes in the LO ODU(s) mapped to the payload area of the ODTU in the next frame of HO OPU2, respectively. The amount of M-bytes in the LO ODU(s) mapped to the payload area of the ODTU in other frames of HO OPU2 is C8M-base; i.e. indicating mapping C8M-base+C8M-delta M-byte data of the LO ODU(s) in an M-byte granularity to the ODTU payload areas in the $3^{rd}$, $4^{th}$, $6^{th}$ and $8^{th}$ frames of HO OPUs in the current multi-frame and the ODTU payload area in the $1^{st}$ frame of HO OPU in the next multi-frame. Mapping C8M-base M-byte data of the LO ODU(s) in an M-byte granularity to the ODTU payload areas in the $2^{nd}$, $5^{th}$ and $7^{th}$ frames of HO OPUs.

Figure 8:
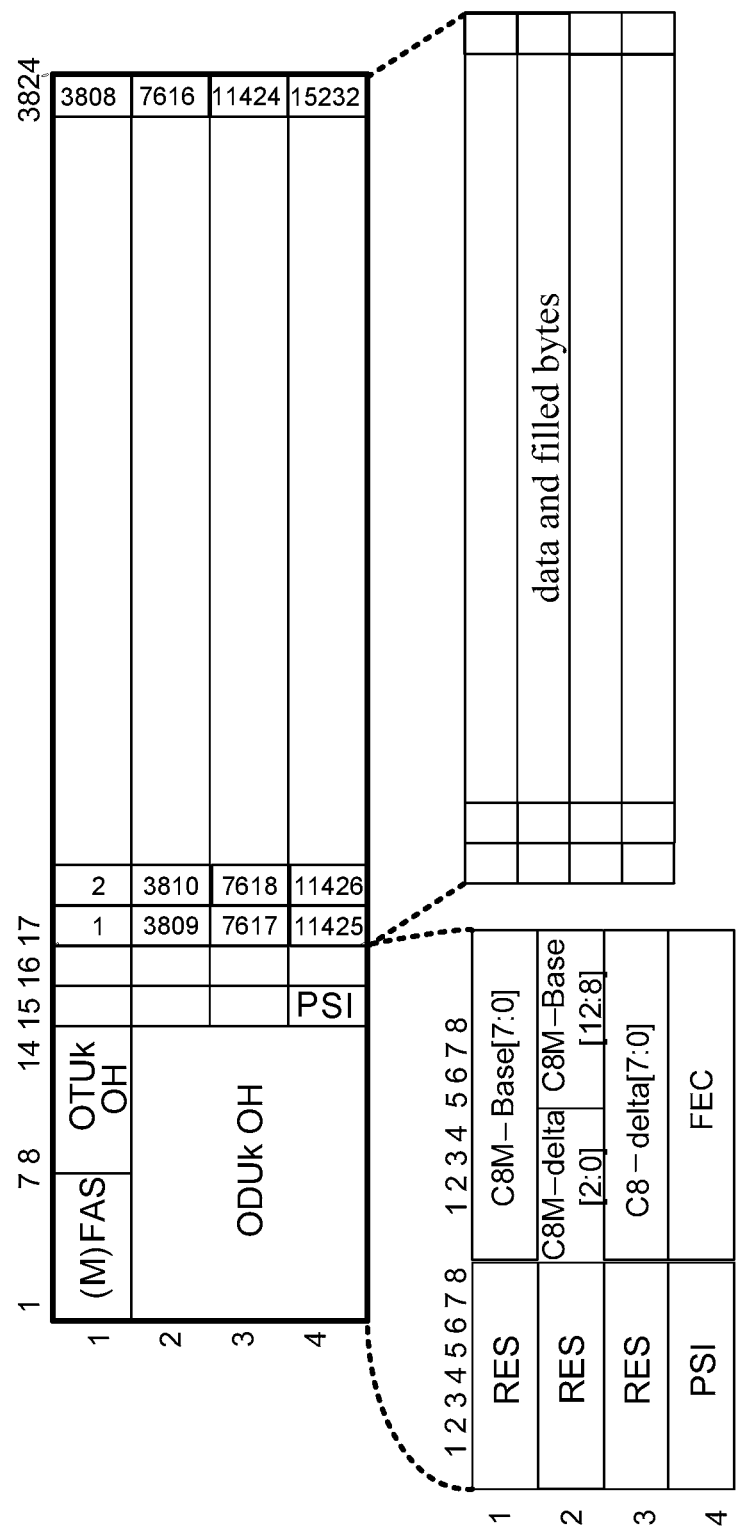
FIG. 8 is a schematic view illustrating information encoding of "C8M-base+C8M-delta+C8-delta" according to an embodiment of the present invention.

In the embodiment of the present invention, the information "C8M-base+C8M-delta+C8-delta" may be encapsulated in the following mode, but not limited thereby, as shown in FIG. 8.

In which, C8M-base occupies 13 bits, C8M-delta occupies 3 bits, C8-delta occupies 8 bits, and FEC occupies 8 bits; herein the FEC error correcting function is added, and an encoding mode of BCH (16, 12) may be used to achieve an effect of correcting an error of 1 bit, and improve the reliability of the information "C8M-base+C8M-delta+C8-delta" during transportation. In addition, the FEC may also be replaced by CRC, and the information "C8M-base+C8M-delta+C8-delta" received at the receiving side is ensured as correct through a CRC verification.

S4: multiplexing the ODTU, which has been mapped the LO ODU and encapsulated with the overhead information, to the HO OPU.

The mapping method in an OTN according to the embodiment of the present invention not only provides a high-efficient and universal mode for mapping the LO ODU to the HO OPU, compatible with processes of mapping LO ODU to HO OPU in different granularities for the convenience of interconnection, but also separates the data information from the clock information to mapping in a large granularity, and carries the clock information with the byte granularity to solve the problem of poor performance of clock recovered at the receiving side caused by mapping only with large granularity.

Figure 9:
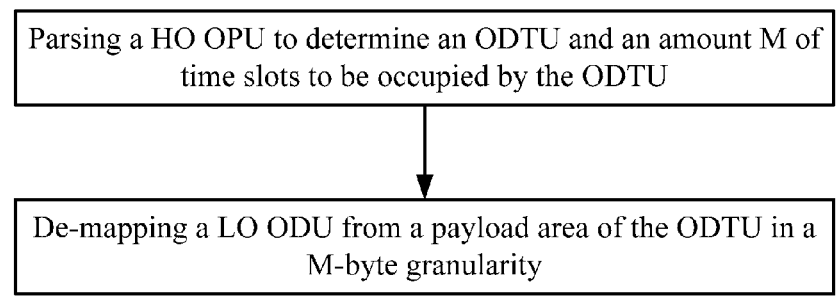
FIG. 9 is a flowchart of a de-mapping method in an OTN according to an embodiment of the present invention.

Correspondingly, at the data receiving side, as shown in FIG. 9, the embodiment of the present invention further provides a de-mapping method in an OTN, for parsing an HO OPU to determine an ODTU and an amount M of time slots occupied by the ODTU; and de-mapping an LO ODU from a payload area of the ODTU in an M-byte granularity.

De-mapping the LO ODU from the payload area of the ODTU in the M-byte granularity includes:

acquiring information of an amount of the LO ODU of M-byte from the overhead of the ODTU; and de-mapping the amount of the LO ODU of M-byte from the payload area of the ODTU in the M-byte granularity.

De-mapping the LO ODU of M-byte from the payload area of the ODTU in the M-byte granularity further includes:

acquiring clock information from the overhead of the ODTU, and recovering the clock of client service according to the clock information.

Figure 10:
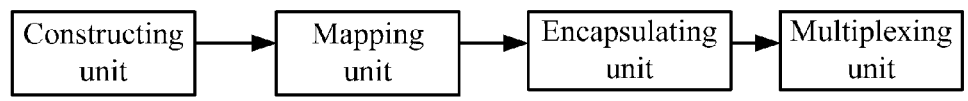
FIG. 10 illustrates a mapping apparatus in an OTN according to an embodiment of the present invention.

As shown in FIG. 10, the embodiment of the present invention further provides a mapping apparatus in an OTN, including:

a constructing unit, configured to construct an ODTU according to an amount M of time slots of an HO OPU to be occupied by an LO ODU;

a mapping unit, configured to for map the LO ODU to a payload area of the ODTU in an M-byte granularity;

an encapsulating unit, configured to encapsulate overhead information to the overhead area of the ODTU; and a multiplexing unit, configured to multiplex the ODTU, which has been mapped the LO ODU and encapsulated with the overhead information, to the HO OPU.

Figure 11:
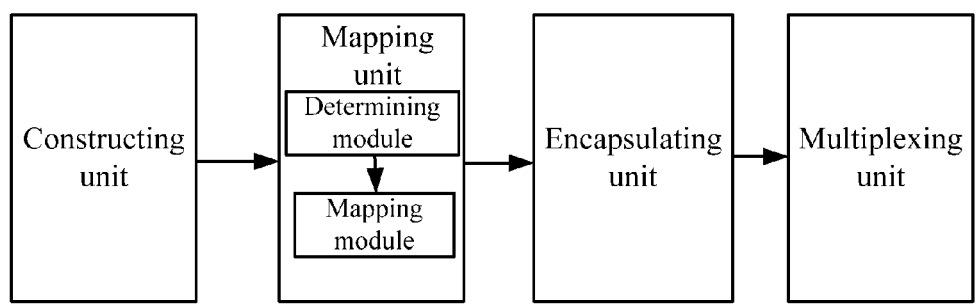
FIG. 11 illustrates a mapping apparatus in an OTN according to another embodiment of the present invention.

As shown in FIG. 11, another embodiment of the present invention provides a mapping apparatus in an OTN, including the constructing unit, the mapping unit, the encapsulating unit and the multiplexing unit as shown in FIG. 10, where the mapping unit includes:

a determining module, configured to determine an amount of the LO ODU of M-byte to be mapped when mapping in an M-byte granularity, according to an amount X of the LO ODU to be transmitted in each multi-frame period;

a mapping module, configured to map the amount of the LO ODU of M-byte to the payload area of the ODTU in the M-byte granularity; and the encapsulating unit is configured to encapsulate the amount information of the LO ODU of M-byte to the overhead area of the ODTU.

In another embodiment of the present invention, the determining module is further adopted for determining clock information according to the amount X of the LO ODU to be transmitted during each multi-frame period; and the encapsulating unit is further configured to encapsulate the clock information to the overhead area of the ODTU.

Figure 12:
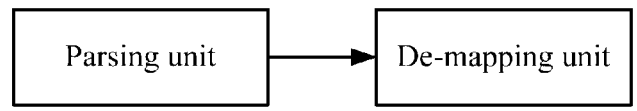
FIG. 12 illustrates a de-mapping apparatus in an OTN according to an embodiment of the present invention.

As shown in FIG. 12, the embodiment of the present invention further provides a de-mapping apparatus in an OTN, including:

a parsing unit, configured to parse an HO OPU to determine an ODTU and an amount M of time slots occupied by the ODTU; and a de-mapping unit, configured to de-map an LO ODU from a payload area of the ODTU in an M-byte granularity.

The detailed contents about signal processing and executions among the components of the above apparatuses are based on the same concept of the method embodiments of the present invention, please refer to the descriptions of the method embodiments of the present invention, and herein are not described.

The above descriptions are just some exemplary embodiments of the present invention, and the protection scope of the present invention is not limited thereby. Any modification or substitution that can be easily conceived by a person skilled in the art within the technical scope disclosed by the present invention shall be covered by the protection scope of the present invention. Therefore, the protection scope of the present invention shall be subject to that of the claims.

What is claimed is:

1. A method for processing data in an Optical Transport Network (OTN), the method comprising:
    mapping a Low Order Optical Channel Data Unit (LO ODU) signal into a payload area of an Optical Channel Data Tributary Unit (ODTU) signal, wherein a group of M LOODU signal bytes is mapped into a group of M ODTU signal bytes, where M is an integer greater than 1 that is equal to a number of tributary slots of a High Order Optical Channel Payload Unit (HO OPU) that are to be occupied by the ODTU signal, wherein the HOOPU is divided into a plurality of tributary slots, and wherein the ODTU signal carries overhead information in an overhead area of the ODTU signal;
    multiplexing the ODTU signal into the HO OPU;
    mapping the HO OPU into a High Order Optical Channel Data Unit (HO ODU);
    mapping the HO ODU into a High Order Optical Channel Transport Unit (HO OTU) signal; and
    sending the HO OTU signal.

2. The method according to claim 1, wherein the overhead information comprises information indicating a number of the M-byte data groups of the LO ODU signal that are mapped during a multi-frame period.

3. The method according to claim 2, wherein the overhead information further comprises clock information that is determined according to a number of the M-byte data groups.

4. The method according to claim 1, wherein the overhead information is presented in an overhead area corresponding to a first tributary slot or a last tributary slot among tributary slots that are occupied by the ODTU signal.

5. The method according to claim 1, wherein the mapping a LOODU signal into a payload area of an ODTU signal and into data groups of M bytes comprises:
    mapping a group of M successive LO ODU bytes into a group of M successive ODTU bytes.

6. An apparatus for processing data in an Optical Transport Network (OTN), the apparatus comprising:
    a processor and a computer readable non-transitory medium having a plurality of computer executable instructions stored thereon which, when executed by the processor, cause the processor to:
    map a Low Order Optical Channel Data Unit (LO ODU) signal into a payload area of an Optical Channel Data Tributary Unit (ODTU) signal, wherein a group of M LO ODU signal bytes is mapped into a group of M ODTU signal bytes, where M is an integer greater than 1 that is equal to a number of tributary slots of a High Order Optical Channel Payload Unit (HO OPU) that are to be occupied by the ODTU signal, wherein the HO OPU is divided into a plurality of tributary slots, and wherein the ODTU signal carries overhead information in an overhead area of the ODTU signal;
    multiplex the ODTU signal into the HO OPU;
    map the HO OPU into a High Order Optical Channel Data Unit (HO ODU);
    map the HO ODU into a High Order Optical Channel Transport Unit (HO OTU) signal; and
    send the HO OTU signal.

7. The apparatus according to claim 6, wherein the overhead information comprises information indicating a number of the M-byte data groups of the LO ODU signal that are mapped during a multi-frame period.

8. The apparatus according to claim 7, wherein the overhead information further comprises clock information that is determined according to a number of the M-byte data groups.

9. The apparatus according to claim 6, wherein the overhead information is presented in an overhead area corresponding to a first tributary slot or a last tributary slot among tributary slots that are occupied by the ODTU signal.

10. An apparatus for processing data in an Optical Transport Network (OTN), comprising:
    a processor and a computer readable non-transitory medium having a plurality of computer executable instructions stored thereon which, when executed by the processor, cause the processor to:
    parse a High Order Optical Channel Payload Unit (HO OPU) to obtain an Optical Channel Data Tributary Unit (ODTU) signal, wherein the HO OPU is divided into a plurality of tributary slots; and
    de-map a Low Order Optical Channel Data Unit (LO ODU) signal from a payload area of the ODTU signal organized in data groups of M bytes, where M is an integer larger than 1 that is equal to a number of the plurality of tributary slots of the HO OPU that are occupied by the ODTU.

11. The apparatus according to claim 10, wherein the de-mapping of groups of M bytes to obtain a Low Order Optical Channel Data Unit (LO ODU) signal from a payload area of the ODTU signal comprises:

acquiring, from an overhead of the ODTU, the number of M-byte data groups of the LO ODU signal that have been mapped into the payload area of the ODTU; and de-mapping the LO ODU signal from the payload area of the ODTU signal organized in data groups of M bytes according to a number of the M-byte data groups.

12. The apparatus according to claim 11, wherein the overhead information is presented in an overhead area corresponding to the first tributary slot or the last tributary slot among tributary slots that are occupied by the ODTU signal.

13. A method for processing data in an Optical Transport Network (OTN), comprising:

mapping a Low Order Optical Channel Data Unit (LO ODU) signal into a payload area of an Optical Channel Data Tributary Unit (ODTU) signal organized into data groups of M bytes, where M is an integer greater than 1 that is equal to a number of tributary slots of a High Order Optical Channel Payload Unit (HO OPU) that are to be occupied by the ODTU signal; and multiplexing the ODTU signal into the HO OPU.

14. The method according to claim 13, wherein the mapping the LO ODU signal into a payload area of the ODTU signal is performed under control of Generic Mapping Procedure (GMP) mapping mechanism.

15. A method for processing data in an Optical Transport Network (OTN), comprising:

mapping a Low Order Optical Channel Data Unit (LO ODU) signal into a payload area of an Optical Channel Data Tributary Unit (ODTU) signal, wherein a group of M bytes of the LO ODU signal are mapped into a group of M bytes of the payload area of the ODTU signal, where M is an integer greater than 1; and multiplexing the ODTU signal into a High Order Optical Channel Payload Unit (HO OPU);

mapping the HO OPU into a High Order Optical Channel Data Unit (HO ODU);

mapping the HO ODU into a High Order Optical Channel Transport Unit (HO OTU) signal;

sending the HO OTU signal.

16. The method according to claim 15, wherein the mapping the LO ODU signal into a payload area of the ODTU signal is performed under control of Generic Mapping Procedure (GMP) mapping mechanism.

* * * * *